US008516256B2

(12) United States Patent
Vogt et al.

(10) Patent No.: US 8,516,256 B2
(45) Date of Patent: Aug. 20, 2013

(54) ROUTE OPTIMIZATION IN MOBILE IP NETWORKS

(75) Inventors: Christian Vogt, San Jose, CA (US); Shinta Sugimoto, Kanagawa (JP)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 277 days.

(21) Appl. No.: 12/863,042

(22) PCT Filed: Jan. 18, 2008

(86) PCT No.: PCT/SE2008/050058
§ 371 (c)(1),
(2), (4) Date: Jul. 15, 2010

(87) PCT Pub. No.: WO2009/091306
PCT Pub. Date: Jul. 23, 2009

(65) Prior Publication Data
US 2011/0055572 A1    Mar. 3, 2011

(51) Int. Cl.
H04L 9/32         (2006.01)
(52) U.S. Cl.
USPC ............................ 713/171; 370/328; 380/277

(58) Field of Classification Search
None
See application file for complete search history.

(56) References Cited

U.S. PATENT DOCUMENTS

| 7,925,027 B2* | 4/2011 | Kempf et al. ............... 380/282 |
| 2006/0253704 A1* | 11/2006 | Kempf et al. ............... 713/158 |
| 2007/0113075 A1* | 5/2007 | Jo et al. ...................... 713/158 |

* cited by examiner

Primary Examiner — Fikremariam A Yalew

(57) ABSTRACT

The present invention the present invention concerns a method for optimizing a route between a mobile node and a correspondent node in mobile Internet protocol networks. The mobile node is served by an anchor point being a node, e.g. a mobile IP home agent. According to the method the anchor point generates a Multi-key Cryptographically Generated Address (MCGA) for the mobile node. The MCGA is generated using at least the public keys of the mobile node and the anchor point. The anchor point assigns and registers the generated MCGA as a home address for the mobile node and sends a binding update message to the correspondent node on behalf of the mobile node. The binding update message includes at least a signature of the MCGA signed by the anchor point. Thereby route optimization can be performed such that data packets can be exchanged between the mobile node and the correspondent node without routing the packets via the anchor point.

20 Claims, 7 Drawing Sheets

ROUTE OPTIMIZATION IN MOBILE IP NETWORKS

TECHNICAL FIELD

The present invention relates to route optimization in a network. More specifically the invention relates to route optimization in Mobile IP networks.

BACKGROUND

In order for mobile nodes to remain reachable while moving around in the Internet, there has to be a specific support for mobility. Otherwise packets destined to a mobile node would not reach the mobile node when it is away from its home link Mobility support in IPv6 is particularly important, as mobile computers are likely to account for a majority or at least a substantial fraction of the population of the Internet during the lifetime of IPv6.

The two main techniques for mobility support in the Internet Protocol are today the following:

Bidirectional tunnelling—A mobile node connects to a stationary anchor point with a bidirectional tunnel. It communicates through the tunnel via a stable IP address, a so-called home address, from the anchor point's link The IP address that terminates the tunnel on the mobile node side at any given point in time is called the mobile node's on-link IP address, also called care-of address.

Route optimization—A mobile node communicates via a direct path to a correspondent node. Packets are routed via the mobile node's on-link IP address. IP address substitution at the mobile node's and correspondent node's IP layers ensures that higher protocol layers see the mobile node's stable IP address instead of the variable on-link IP address.

Both bidirectional tunnelling and route optimization require extra mobility functionality on mobile nodes. This increases the complexity of node implementations and precludes mobility support for legacy nodes. Proxy-based IP mobility protocols are being developed to mitigate this. They do not require mobility functionality on a mobile node, but put such functionality on the mobile node's access router instead. The mobile node's access router thus becomes a proxy of the mobile node, and one of its IP addresses becomes the mobile node's on-link IP address. Proxy Mobile Internet Protocol version 6 (PMIPv6) is currently the main proxy-based IP mobility protocol.

The base specification of Proxy Mobile IPv6 uses bidirectional tunnelling. However, since bidirectional tunnelling increases bandwidth utilization and packet propagation delays due to a sub-optimal packet route via an anchor point, efforts (see e.g. Behcet Sarikaya et al.: "PMIPv6 Route Optimization Protocol, draft-qin-netlmm-pmipro-00"; and Julien Abeille, Marco Liebsch: "Route Optimization for Proxy Mobile IPv6, draft-abeille-netlmm-proxymip6ro-00") are since recently underway to extend Proxy Mobile IPv6 by a mode for route optimization.

Route optimization requires a mobile node to prove to a correspondent node that it is the legitimate owner of its stable IP address. This IP address ownership proof must in general do without a pre-existing security or trust relationship between the mobile node and the correspondent node.

One of the main protocols for route optimization in Mobile IPv6, Enhanced Route Optimization (see RFC4866, Jari Arkko, Christian Vogt, Wassim Haddad: "Enhanced Route Optimization for Mobile IPv6"), enables a mobile node to prove ownership of its stable IP address by means of generating the stable IP address cryptographically. Specifically, the stable IP address is a function of the public component of the mobile node's public/private key pair, and the mobile node proves ownership of the stable IP address by presenting evidence that it knows the respective private component.

Unfortunately, direct translation of the methodology of Enhanced Route Optimization to Proxy Mobile IPv6 would require the mobile node's access router to learn the mobile node's private key, and it would require the transferral of the mobile node's private key across access routers as the mobile node moves. Both puts the mobile node's public key at an increased risk of compromise and is hence unacceptable from a security perspective.

Behcet Sarikaya et al.: "PMIPv6 Route Optimization Protocol, draft-qin-netlmm-pmipro-00", specifies a proxy-based route optimization solution based on Enhanced Route Optimization. It directly moves the mobile node's mobility functionality to the access router. As a part of this, it requires a mobile node's access router to learn the mobile node's private key. It also requires the transferral of the mobile node's private key between access routers as the mobile node moves. Both contradict common security guidelines.

Julien Abeille, Marco Liebsch: "Route Optimization for Proxy Mobile IPv6, draft-abeille-netlmm-proxymip6ro-00" provides support for route optimization only if both the mobile node and the correspondent node are located in a Proxy Mobile IPv6 domain. The advantage of this is that a pre-existing security and trust relationship can be assumed to exist between the proxies of the mobile node and the correspondent node. This relationship is utilized for IP address ownership proofs in Sarikaya et al. The disadvantage of requiring a correspondent node to be in a Proxy Mobile IPv6 domain is that it limits the set of correspondent nodes for which communications can be route optimized. Correspondent nodes with support for Enhanced Route Optimization according to RFC4866 that are not in a Proxy Mobile IPv6 domain are not supported.

Sangjin Jeong, Ryuji Wakikawa: "Route Optimization Support for Proxy Mobile IPv6 (PMIPv6), draft-jeong-netlmm-ro-support-for-pmip6-00" considers route optimization with both, correspondent nodes within a Proxy Mobile IPv6 domain, and correspondent nodes outside a Proxy Mobile IPv6 domain. For the former case, security and trust relationships are assumed to exist between the proxies of the mobile node and the correspondent node. This has the same disadvantages as in Julien Abeille et al. For the latter case, route optimization is realized based on the security design of Mobile IPv6 (see David B. Johnson, Charles E. Perkins, Jari Arkko: "Mobility Support in IPv6", RFC 3775). However, this solution presents some lacks in security, produces long handover delays, and incurs a quite large signalling overhead.

SUMMARY

An object of the present invention is therefore to provide a method and an apparatus for route optimization that is more secure than existing solutions.

A further object of the invention is to provide route optimization that can be used regardless of whether the correspondent node, below referred to as a correspondent node, is in a Proxy Mobile IPv6 domain or not.

According to the present invention a method for optimizing a route between a mobile node and a correspondent node in mobile Internet protocol networks is disclosed. The mobile node, also called mobile node, is adapted to be served by at least one anchor point, the anchor point being a node, e.g. a mobile IP home agent. According to the method the anchor point generates a Multi-key Cryptographically Generated Address (MCGA) for the mobile node. The MCGA being generated using at least the public keys of the mobile node and the anchor. The anchor point assigns and registers the generated MCGA as a home address for the mobile node and sends a binding update message to the correspondent node on behalf of the mobile node. The binding update message includes at least a signature of the MCGA signed by the anchor. Thereby route optimization can be performed such that data packets can be exchanged between the mobile node and the correspondent node without routing the packets via the anchor point.

An advantage of the method according to the present invention is that there is no sharing of private keys and address ownership can be proved by using the mobile nodes own public key pair.

A further advantage is that there is no need for transfer of private keys among network entities.

According to a preferred embodiment the method includes receiving a binding acknowledgement message from the correspondent node, the acknowledgment including an authentication credential. Preferably a permanent home keygen token is used as part of credentials for the binding acknowledgement message.

According to a further embodiment of the invention the assignment of the MCGA includes the step of sending necessary information between the mobile node and the anchor point during an Internet Key Exchange (IKE) authentication procedure.

According to the present invention, an anchor node for optimizing a route in mobile Internet protocol networks is also disclosed. The anchor node includes a generating unit for generating a Multi-key Cryptographically Generated Address (MCGA) for a mobile node. The node further includes a processing unit for assigning and registering the MCGA as home address for the mobile node and also a transmitting unit for sending a binding update message to the correspondent node on behalf of the mobile node. The binding update message shall be provided with a signature of the MCGA signed by the anchor node.

By having an anchor node according to the invention route optimization can be performed by using public keys and without transferring any private keys between nodes.

The invention will now be more closely described with the aid of embodiments and with reference to enclosed drawings.

DETAILED DESCRIPTION

Figure 1:
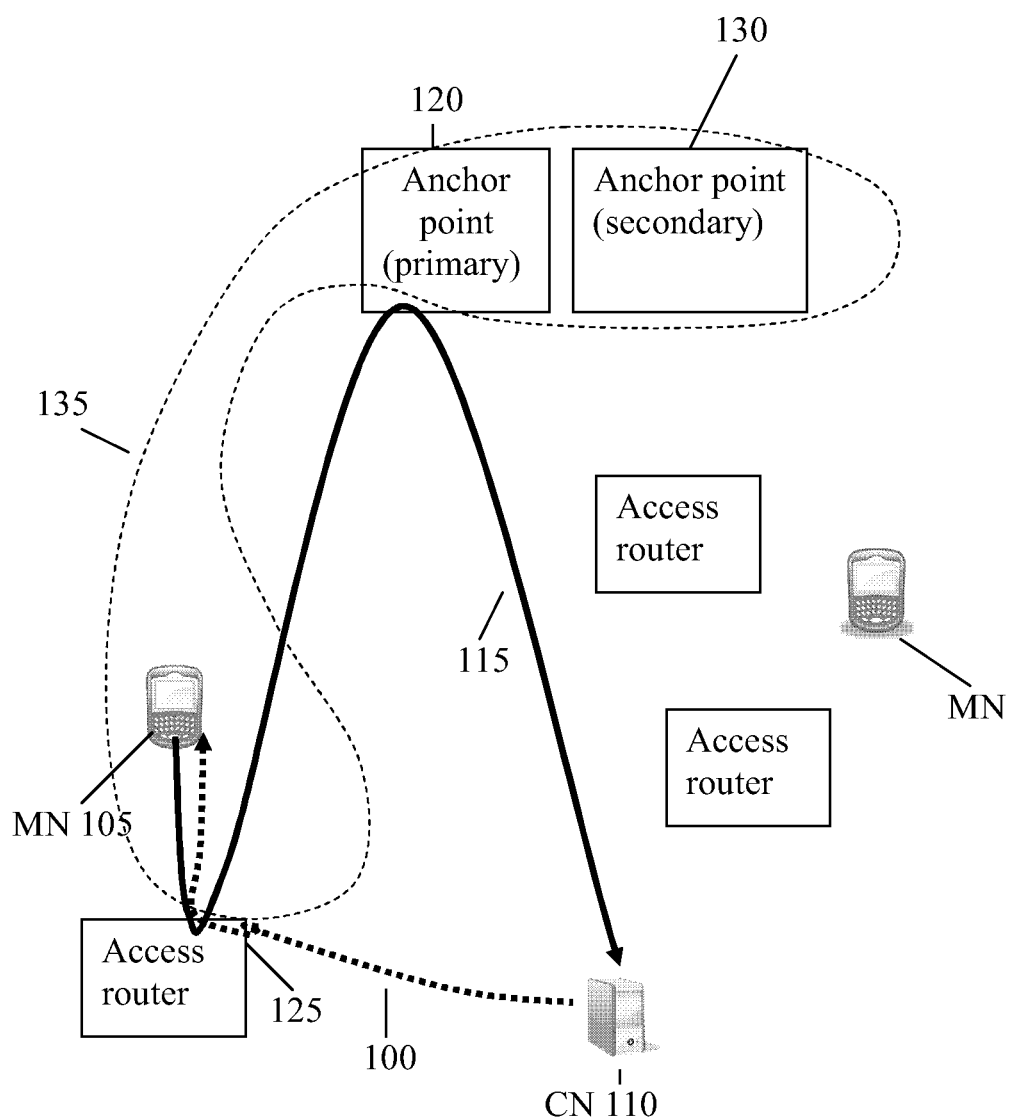
FIG. 1 illustrates a schematic diagram of a method for route optimization according to an embodiment of the present invention.

FIG. 1 shows an overview of a method for route optimization, via the route optimized path 100 between a mobile node (MN) 105 and a correspondent node (CN) 110 according to the invention. A mobile or correspondent node is preferably an IPv6 node and can be a mobile phone, a personal digital assistant (PDA), a wirelessly enabled laptop, etc. or any similar device or user equipment. The nodes 105, 110 can be roaming in the same administrative domain but can also be in separate domains. In a normal session, if the MN 105 exchange traffic with the CN 110, packets are sent to an access router 125 serving the MN 105 and then automatically tunnelled to an anchor point 120 and then sent to the CN 110. The anchor point can e.g. be a mobile IP home agent, which proxies the mobile node at the mobile node's home address and mainly serves as a relay for payload packets. The CN can be the final destination of the media or it can supply for onward transmission to other nodes. This will result in a longer route 115 (and hence higher overhead) than if the access router directly exchanged the traffic with the CN via the route optimization path 100, which would reduce the load on the network between the anchor point 120 and the CN.

In order to achieve route optimization according to the present invention, an anchor point generates a Multi-key Cryptographically Generated Address (MCGA) for the mobile node. A CGA (Cryptographically Generated Address) is an IPv6 address in which the interface identifier portion of the address is generated by taking the hash of an RSA public key generated by the node, together with some additional parameters. CGA's are used in SEcure Neighbor Discovery (SEND), a protocol for securing the mapping between an IPv6 address and a link address. One drawback of SEND as specified is that it does not allow CGAs to be defended by proxies. Therefore an extension of SEND to addresses that are cryptographically generated using multiple public keys, called MCGAs have been proposed, (see James Kempf, Craig Gentry: Secure IPv6 Address Proxying using Multi-Key Cryptographically Generated Addresses (MCGAs), draft-kempf-cgaext-ringsig-ndproxy-00.txt, August 2007, work-in-progress). Neighbor Discovery messages for MCGAs are signed with an RSA ring signature, a type of signature that can be generated using the private key of any node from a group of nodes but which requires the public keys of all group members to verify, see R. Rivest, A. Shamir, and Y. Tauman, "How to Leak a Secret," Proceedings of Asiacrypt 2001, pages 552-565; below referred to as RST. MCGAs can be securely proxied by all nodes that contribute keys to the address, preserving location privacy for the address, i.e. a receiver cannot determine from the IPv6 address, ring signature or cryptographic parameters whether the node or the proxy is defending the address.

The MCGA is assigned to the mobile node and will be used as a home address in the operation of Mobile IP and similar techniques. By the nature of MCGA, the home address is inherently bound to the list of public keys owned by the group of nodes, i.e. the members of the ring signature scheme. The group comprises the mobile node and the anchor point, but can optionally also comprise other network entities such as one or more secondary anchor points 130. In FIG. 1, the group of nodes are shown as the nodes surrounded by the dashed line 135, i.e. MN 105, primary anchor point 120 and secondary anchor point 130. As the anchor point is a ring member, it can be a signer of the message, i.e., the anchor point is capable of claiming the address ownership of the home address assigned to the mobile node. The anchor point can therefore send the correspondent binding update message on behalf of the mobile node, leveraging the security property of MCGA. Thus, signalling messages for enabling route optimization can be sent by the anchor point on behalf of the mobile node.

Figure 2:
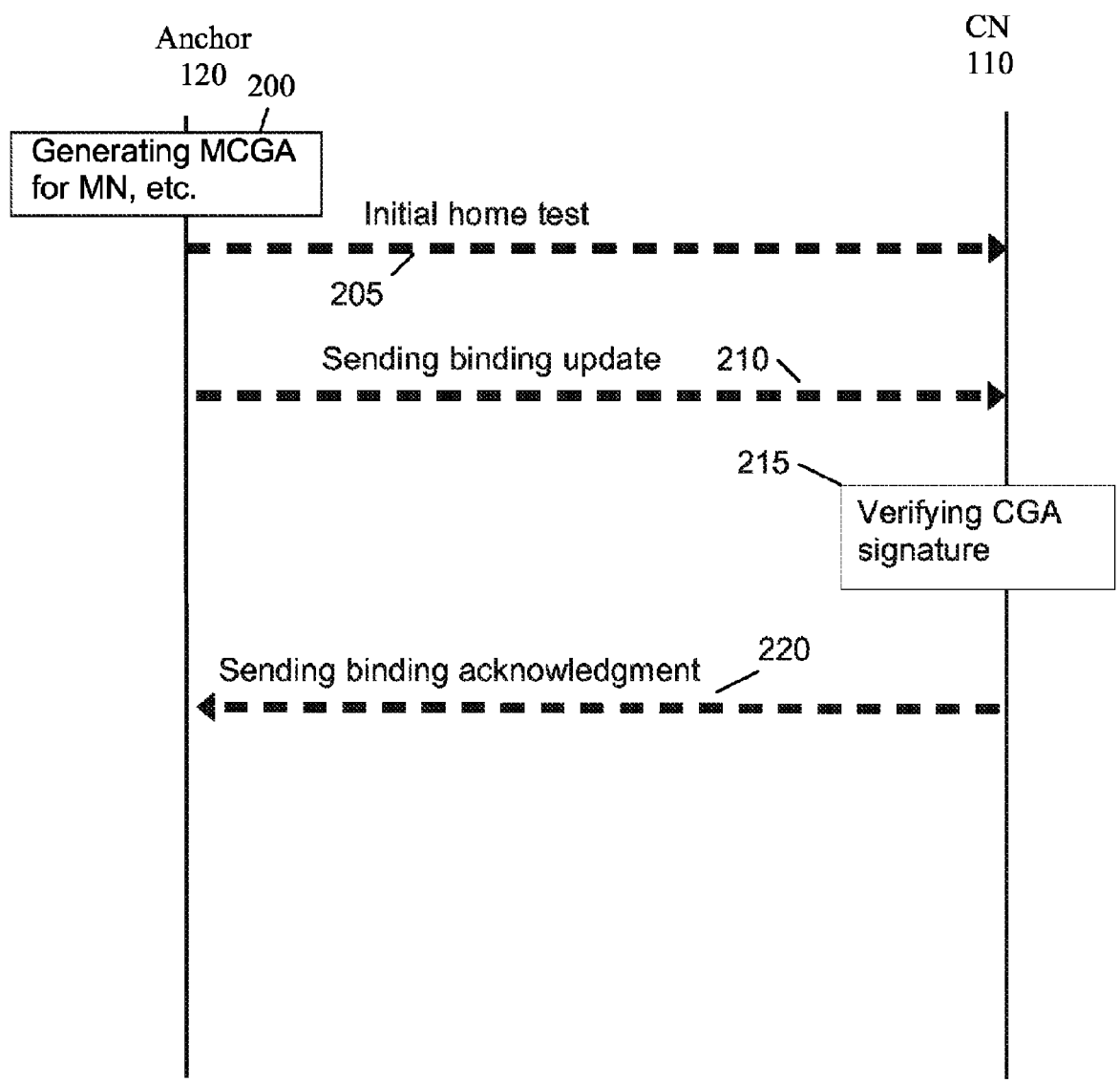
FIG. 2 illustrates a schematic diagram for signaling between nodes according to an embodiment of the present invention.

A method for initiating route optimization according to an embodiment of the present invention will be further described with reference to FIG. 2 showing a schematic diagram for signaling between the anchor point and the correspondent node. In this example, the mobile node 105 is served by the anchor point 120 (e.g. a Mobile IP home agent) and is communicating with a CN 110. The anchor point generates an MCGA for the mobile node in block 200 using the private key of the anchor point. The address is assigned to the mobile node as a home address. Binding of the mobile node, i.e. the association between the home address and the care-of address of the mobile node, is registered at the anchor point by the IP mobility protocol. Accordingly, a bi-directional path for user traffic is established between the MN 105 and the anchor point 120, via the access router 125. The anchor points then attempts to create a correspondent binding at the correspondent node acting on behalf of the mobile node. The anchor point performs an initial home test 205 with the correspondent node 110, preferably as defined in RFC4866. An initial home address test is necessary despite a cryptographic proof of home address ownership to protect against spoofed subnet prefixes in home addresses. Otherwise a malicious node could cryptographically generate a home address with the subnet prefix of a victim network, and request a correspondent node to register a binding between this spoofed home address and the attacker's own care-of address. After the home test is done, the anchor point sends the correspondent binding update message 210 to the correspondent node appending the MCGA signature signed by the private key of the anchor point. Since the private key of the anchor point is appended, the correspondent node can be certain that the sender is legitimate, without the mobile node needing to share its private key. Upon receiving the binding update, the correspondent node authenticates the binding update message by verifying the alleged signature, see block 215. The correspondent node then sends a binding acknowledgement message 220 to the sender, i.e. the anchor point 120, to inform of the successful receipt of the binding update message 210. Included in the binding acknowledgment message or in a subsequent message is an authentication credential. The sharing of the token between the sender of the binding update message (i.e. anchor point) and the correspondent node eliminates the need for periodic home tests. After receiving the binding acknowledgment message in the anchor point there are no reasons for the packets to be routed via the anchor point and accordingly a route optimized path is established between the mobile node and the correspondent node. The decision to activate route optimization is preferably performed by the anchor point. The decision can also be performed by some other node associated with the anchor point.

According to the invention the anchor point 120 solely maintains the status and record of correspondent binding management, preferably by keeping a record of correspondent binding reception comprising a home address of the mobile node 105 and a care-of address of a correspondent node 110, and a correspondent binding registration record comprising at least an IP address of the correspondent node. In addition, the anchor point stores the cryptographic materials concerning the MCGA along with the binding information of the mobile node.

One of the advantages of the present invention is that there is no sharing of private keys, yet the mobile node is capable of proving address ownership by using its own public key pair. In addition, there is no need for transfer of private keys among network entities.

The MCGA for the mobile node 105 is preferably generated at the bootstrap stage and is performed under the leadership of the anchor point 120. In the normal case, the group 135 consists of the anchor point and the mobile node. However, other network entities such as secondary anchor points 130 may also participate in the group. Generation of the MCGA can be done in a static or dynamic way. In a static approach, the MCGA group members are determined according to the information stored in a certain database, e.g. a Home Subscriber Server (HSS) (350 shown in FIG. 4). In a dynamic approach, the group members are selected by the anchor point 120 taking various information (e.g. whether or not a secondary anchor point 130 is available for the mobile node 105) into account. The mobile node may also get involved in the selection of the public key by providing information indicating which public key that should be used for generation of the MCGA.

It should be noted that once the MCGA is formulated, members of the ring group 135 cannot be changed due to the nature of the ring signature scheme. This means that, if there is a need for updating members, the associated MCGA needs to be re-generated.

The anchor point sends a correspondent binding update message 210 to the peer (correspondent node 110) of the mobile node 105 using the property of MCGA. The anchor point 120, the sender of correspondent binding update message 210, generates a signature by using its private key. The private key should be paired with one of the group members' public keys used for generating the MCGA. The signature is generated based on RFC 4866 and the concept of the MCGA. As defined in RFC4866, the procedure of sending correspondent binding update depends on the status of association established between the sender and receiver of the binding update message, in this case the anchor point and the CN, respectively. In order to authenticate the correspondent binding update message by the MCGA property, the message should preferably comprise the signature, list of public keys, and nonce index (non-zero). The message could e.g. also contain a lifetime field indicating a requested lifetime for the communication. An example of a method for containing the list of public keys in the binding update message is to use the CGA Parameters Option defined in RFC4866.

The correspondent node may authenticate the received binding update message 210 by verifying the MCGA signature 215. Verification of the signature is done based on the concept of ring signature, see RST. If the alleged MCGA signature is verified, the correspondent node generates an authentication credential and sends it in a binding acknowledgment message 220 to the sender of the binding update message. An authentication credential is a secret shared by the sender and the CN to be used for authenticating the binding update message. An authentication credential can be permanent or semi-permanent and can e.g. be a permanent home keygen token as defined in RFC4866. An authentication credential is preferably encrypted and is used to authenticate nodes more efficiently in subsequent registrations. Nodes may renew the authentication credential on an infrequent basis, which is why the credential in some embodiments is neither constant nor short-lived, and why the security association between the nodes may be called "semi-permanent".

There is no need for the correspondent node to certify public keys contained in the binding update message 210. This is because the authorization of the anchor point is implicitly done by the home test 205 which has preferably taken place prior to the correspondent binding registration.

From the correspondent node viewpoint, it is not known whether the binding update message 205 is sent by the mobile node 105 or by its proxy (anchor point) 120 due to the nature of the ring signature scheme. However, anonymity does not raise any security issue because the real issue is address ownership in this case, i.e., whether the request (creation of binding) was made by the legitimate owner of the home address or not.

Figure 3:
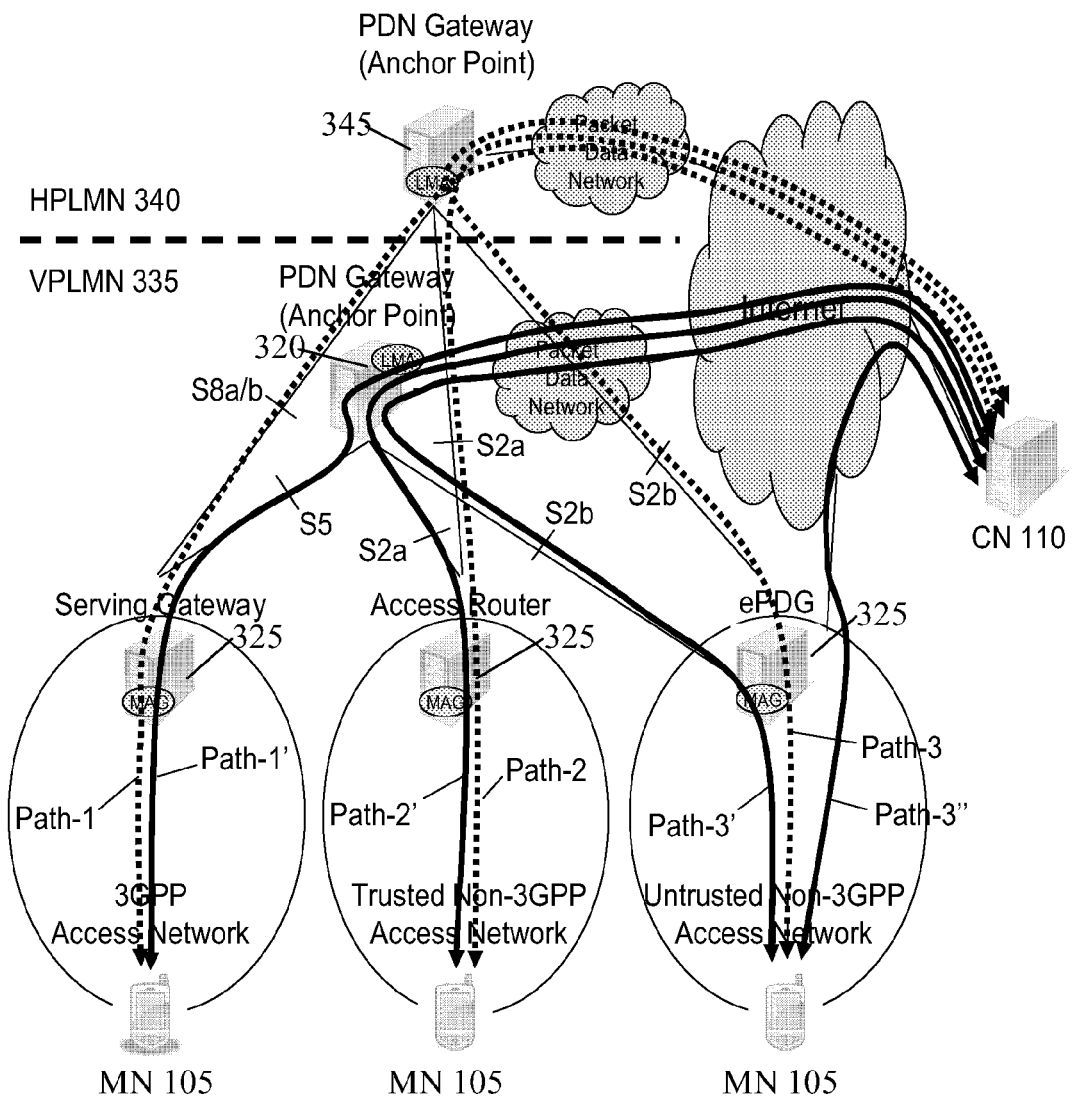
FIG. 3 illustrates schematically a diagram for signaling between nodes according to the present invention in the 3GPP SAE architecture.
Figure 4:
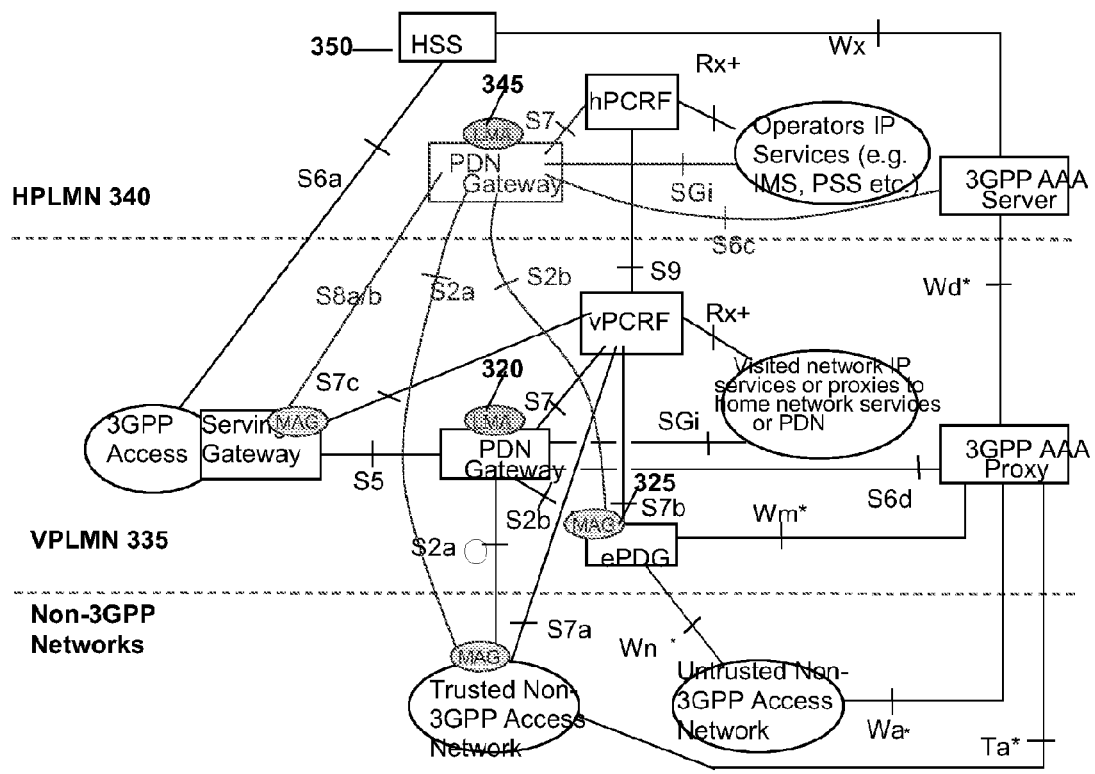
FIG. 4 illustrates schematically the architecture of 3GPP SAE.

With reference to FIG. 3 and FIG. 4 an embodiment in which the invention is adapted to the 3GPP SAE architecture is presented. FIG. 4 schematically depicts the architecture of 3GPP SAE, see "3GPP TS 23.402 3GPP System Architecture Evolution Architecture Enhancements for non-3GPP accesses (Release 8)", and FIG. 3 depicts the nodes, the access routers and the anchor point. Some elements shown in the figures may not be described in the present application. In this embodiment, a mobile node denoted as MN 105 in FIG. 3, is assumed to be attached to a visited network domain, Visited Public Land Mobile Network (VPLMN) 335. It is also assumed that Proxy Mobile IPv6 (PMIPv6) is used to handle IP mobility both for local and global mobility, i.e., the interface denoted S8b between Serving Gateway and the Packet Data Network (PDN) Gateway in the Home Public Land Mobile Network (HPLMN) 340 and the interfaces between the PDN Gateway in VPLMN and Serving Gateway (S5), Trusted non-3GPP Access (S2a), and ePDG (S2b) are all PMIPv6. The MN has two IP addresses, one in HPLMN (HoA@HPLMN), a Global Home Address (GHoA), assigned by the PDN GW in HPLMN, and one in VPLMN (HoA@VPLMN), a Local Home Address (LHoA). From the upper layer protocol perspectives, it is advantageous for the MN to use an IP address which is constantly available (i.e., HoA@HPLMN) for the communication. Normally, MN is not knowledgeable about which IP address has what characteristics or roles.

However, a choice of IP address to which IP packet is routed should be made carefully in the 3GPP SAE architecture for the policy control and charging reasons. In the 3GPP SAE architecture, all the user traffic is required to traverse at least one of the policy control enforcement points so that the network operator could monitor the user traffic. In the 3GPP SAE architecture, policy enforcement points are normally located at PDN Gateways, also called Local Mobility Anchors (LMAs).

Taking the above into account, route optimization in the 3GPP SAE architecture can be performed according to the present invention with reference to FIGS. 3 and 4. In roaming scenarios, the LMA 345 in the home network 340 allocates an MCGA (i.e., HoA@HPLMN) for the mobile node as its home address and the resulting routing paths between the mobile node, visiting different types of access networks, and the correspondent node would be either Path-1, Path-2, and Path-3, respectively. According to the present invention, the LMA 345 sends binding update messages to the correspondent node appending the MCGA signature. The choice of care-of address shall be made in synch with the system configuration of policy control and charging, i.e., the care-of address is chosen so as the route optimized traffic traverses the policy enforcement point. Therefore it is most likely that the IP address assigned by the LMA 320 in the visited network (i.e., HoA@VPLMN) is chosen as a care-of address. For instance, in the case where the mobile node is attached to a 3GPP access network, an optimized routing path Path-1' (compared to the normal path Path-1) can be established. In the case where the mobile node is attached to an untrusted non-3GPP access network, the optimized routing path may differ (Path-3' or Path-3") depending on the choice of care-of address. The LMA sends a binding update message to the correspondent node, CN 110 on behalf of the mobile node appending the MCGA signature. The LMA signs the message using its private key. The CN verifies the MCGA signature, and if it is verified the CN sends a binding acknowledgment message to the sender of the binding update message, which in this case is the LMA, including an authentication credential. A route optimized path can then be established between the mobile node and the correspondent node.

There is however no need for the LMA 320 in the VPLMN 335 to participate in the MCGA group. This is because prediction of the LMA to which the MN will visit is simply difficult. Including LMAs that are potentially serving MN in the future will increase the cost of signalling messages, as the list of a number of public keys can easily grow. The above mentioned LMA are thus preferably an LMA 345 (FIG. 3) located in the mobile nodes' home network. The care-of address specified in the binding update message is the local home address (HoA@VPLMN), which allows the subsequent traffic to be sent to the PDN Gateway (LMA) in the VPLMN 335. Therefore, the PDN Gateway in the VPLMN should be capable of performing care-of test. It should be noted that there is no direct interface between the PDN Gateway 345 in HPLMN 340 and the PDN Gateway 320 in VPLMN 335. Therefore, the signalling messages concerning route optimization should be transported over the S7 and S9 interfaces.

In order for an LMA to perform generation of CGA's, the LMA needs full set of public keys of the group members. In the 3GPP SAE architecture, the public key(s) of the user is stored in an HSS 350. Therefore, the LMA accesses the HSS 350 over the AAA servers. The PDN Gateway (LMA) in the HPLMN 340 request the public key of the MN over the S6c and Wx interfaces.

Figure 5:
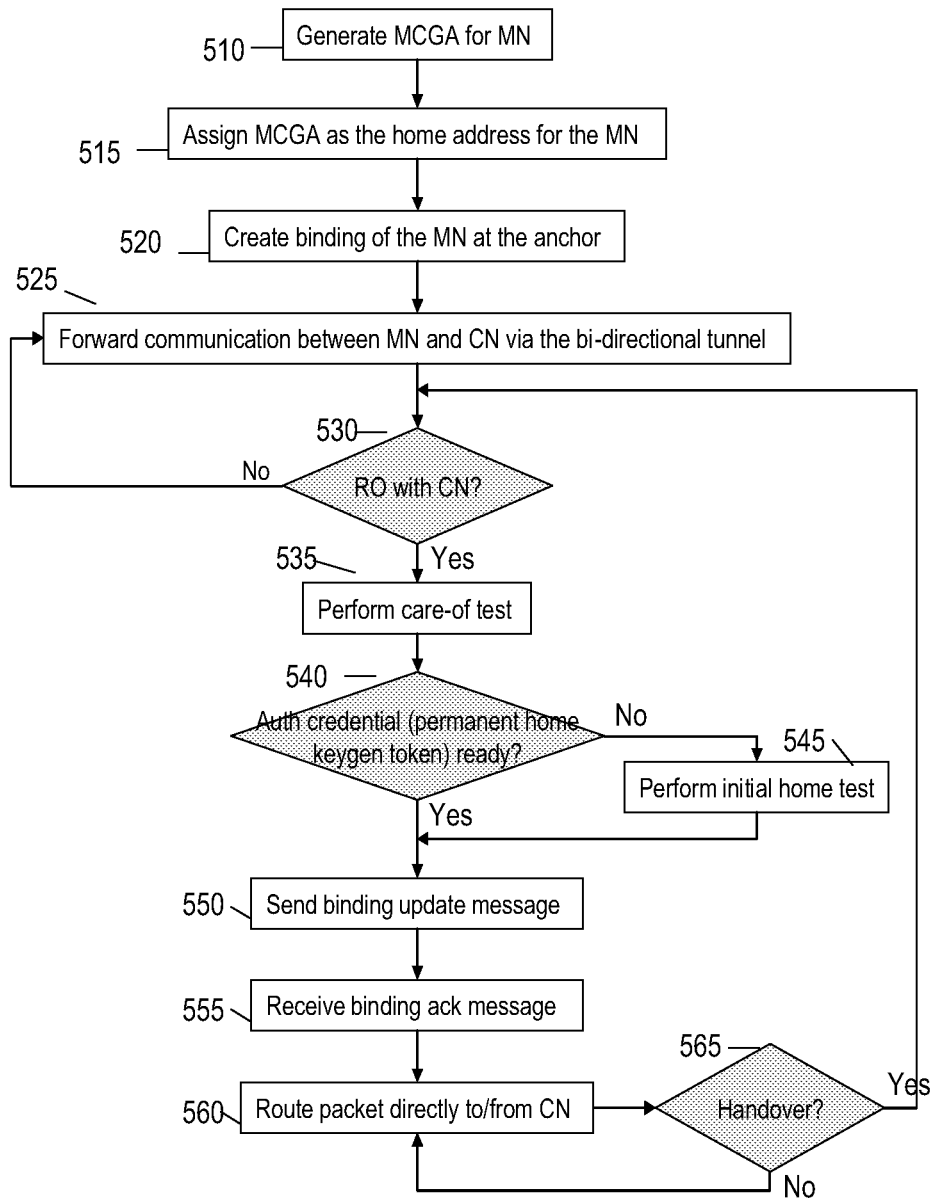
FIG. 5 is a flowchart illustrating a method of handling route optimization according to the invention.

FIG. 5 is a flowchart illustrating a method of initiating route optimization being performed by an anchor point. The method is initiated in step 510 when the anchor point generates a multi-key cryptographically generated address (MCGA) for the MN. The generation of the MCGA is made in the bootstrap stage, step 510. The MCGA is assigned as a home address for the MN, step 515, and the binding of the MN is registered at the anchor point, step 520. A normal bi-directional path for the traffic is established in step 525 in which the packets are routed via the anchor point. At some point of time, the anchor point determines whether route optimization should be done for the transaction with a given CN, step 530. If route optimization is needed or wanted, according to alternative "Yes", steps for creating binding at the correspondent node are taken, i.e. a care-of test is performed, step 535, and it is checked whether authenticating credentials, such as a permanent home keygen token, are ready in step 540. If there is no semi-permanent security association established between the anchor point (sender of the binding update message) and the correspondent node, according to alternative "No", an initial home address test is required, see step 545. Consequently, an authentication credential (a permanent home keygen token) required to authenticate the binding update message is stored at the anchor point. In step 550 the anchor point sends a binding update message to the correspondent node, the message being appended with the MCGA signature. If the correspondent node verifies the message, it sends, in step 555, a binding acknowledgment message back to the anchor point, the message including an authentication credential. In step 560 the traffic or packets are routed directly between the CN and the MN, alternatively via one or more access routers—and/or via an anchor point in the visited network in the 3GPP SAE embodiment. If the MN for some reason roams to another network or domain (step 565), it is considered whether route optimization should be continued in step 530 according to a "Yes" alternative, or not.

Figure 6:
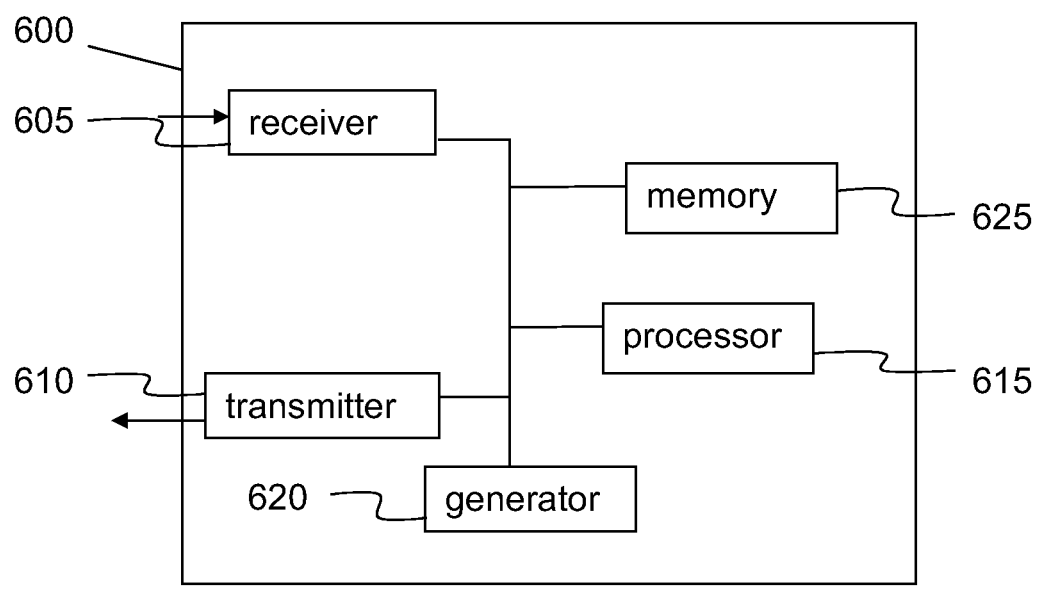
FIG. 6 illustrates a schematic block with the components of an anchor node for initiating route optimization according to the invention.

FIG. 6 illustrates schematically the components of a node 600 for handling route optimization according to the invention. The components are in this case implemented in a single box, however they can of course be implemented in many separate boxes. The node is an anchor point, also called an anchor node, e.g. a Local Mobility Anchor (LMA) and it comprises a receiver 605 and a transmitter 610 for receiving and transmitting IP packets. Some of the components that are shown as separate entities can of course be merged into other entities. The node further comprises a processor 615 or similar for assigning and registering an MCGA as a home address for a mobile node. The processor 615 is preferably also arranged in order to activate route optimization for the communication between the MN and a CN in the light of e.g. RTT measurement results, ensuring that route optimization is only performed where required. The node further comprises a generator 620 for generating said MCGA and preferably also a memory 625 for storing binding information for nodes. Further, a database may be included comprising a list of policy settings regarding route optimization, i.e. different criteria based on which route optimization is initiated, maintained or terminated and/or public keys of mobile nodes.

Figure 7:
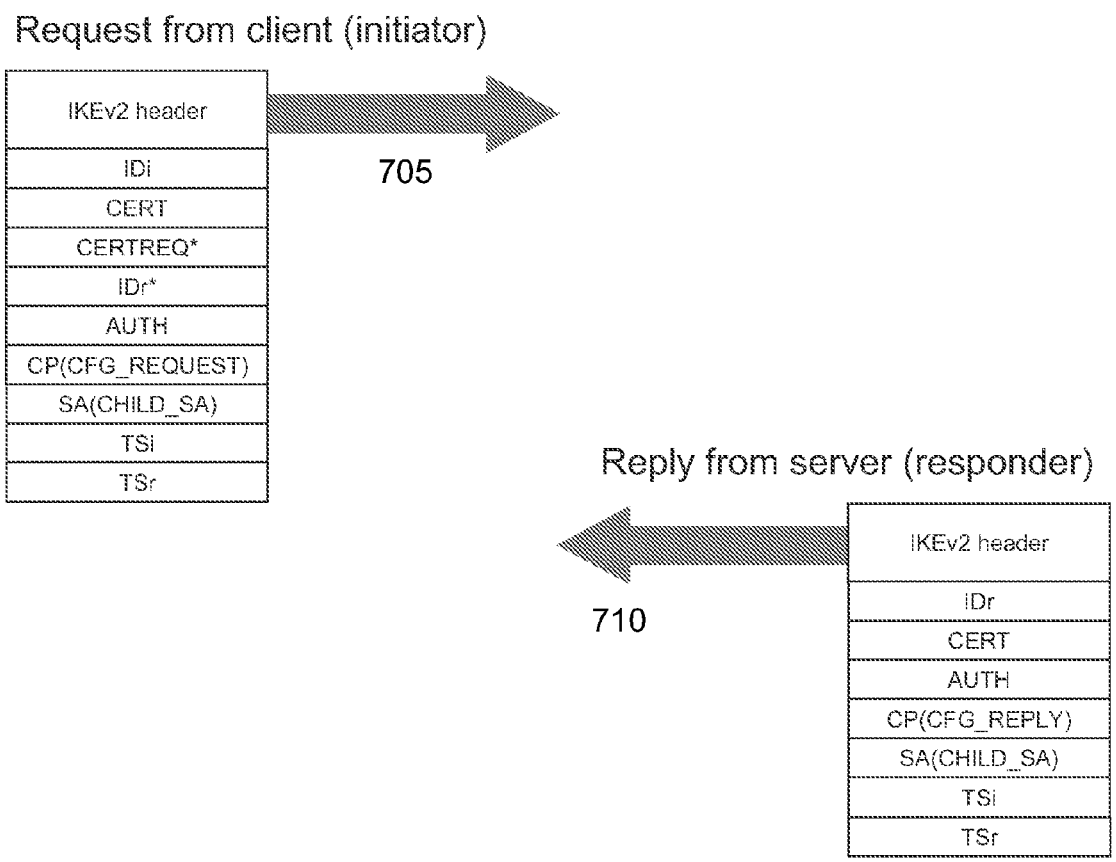
FIG. 7 illustrates schematically the signalling flow of an IKE_AUTH message exchange in which an MCGA is generated for the client.

FIG. 7 illustrates schematically the signalling flow of authentication in IKE (known as an IKE_AUTH message exchange) in which an MCGA is generated for the client. According to the present invention the client is the mobile node and the server is the anchor point. Below, extensions to IKEv2 enabling client and server to exchange necessary information for generating an MCGA are described. The extensions are used during the IKE_AUTH message exchange where an address to be used by the client is configured by the server using configuration payload. The procedure is the same as in normal exchange of configuration payload except that the response and request contains the public keys from which the MCGA is generated. As shown in FIG. 7, the client sends, 705, a request message indicating that it wants an IP address to be configured by the server. In addition, the client indicates the type of IP address as an MCGA by specifying a newly defined attribute called INTERNAL_IP6_MCGA in the configuration payload, denoted CP(CFG_REQUEST). The configuration payload contains the public key of the client which is used for the generation of the MCGA. When the server receives the request from the client, it collects public keys of the nodes that are supposed to participate in the group for an MCGA to be assigned to the client. The server may contact external databases for collecting the public keys of other group members if necessary. Once the address is generated, the server sends a response message 710 to the client, which includes the result of the address configuration. The configuration payload, denoted CP(CFG_REPLY) contains the MCGA and the list of associated public keys. The client extracts the MCGA and assigns it to the local interface. The client should also store the public keys that are associated with the MCGA for future use of generating MCGA signature. In FIG. 7, Identification—Initiator is abbreviated as IDi; Identification—Responder as IDr; Certificate as CERT; Certificate Request as CERTREQ; Authentication as AUTH, Configuration Payload as CP; Traffic Selector—Initiator as TSi; Traffic Selector—Responder as TSr; and Security Association as SA.

In essence, the extensions enable
1) the client to inform the server of the will to get an MCGA assigned,
2) the client to transfer its public key to the server who generates the IP address, and
3) the server to provide the complete set of public keys that are associated with the MCGA to the client.

IKEv2, see C. Kaufman, et al., "Internet Key Exchange (IKEv2) Protocol," RFC 4306, is considered as a default protocol for establishing and maintaining keys to protect mobility signals in Mobile IP networks. In some cases, home address assignment is expected to be done by the use of configuration payload of IKEv2.

In accordance with the above, a general concept of the invention is to let anchor points generate an MCGA for a mobile node, and assign it to the said mobile node as its home address, which allows the anchor points to prove ownership of the address (MCGA) acting on behalf of the mobile node. This provides the following:
1) Authentication of binding update message—the anchor point becomes the signer of the message proving the ownership of the MN's home address.
2) Address management—the anchor point generates and assigns an MCGA for the MN and serves IP mobility management for the address.
3) Group management—the anchor point formulates a group of nodes which can be a potential signer (=sender) of the binding update message.

The present invention provides a number of advantages, e.g. multiple entities can participate in a group whose members are capable of performing correspondent binding registration acting on behalf of the mobile node. There is no need to transfer mobility context of mobile node concerning route optimization among network entities (e.g. PMIPv6 MAG). There is also no need for transfer of cryptographic materials (especially the private keys of mobile nodes) among network entities. Furthermore, the mobile node can take advantage of the self-certifying property of the IP address (home address) by using its public key pair. For instance, the mobile can behave as an enhanced SEND node.

The invention claimed is:
1. Method of optimizing a route between a mobile node and a correspondent node in mobile Internet protocol networks, said mobile node being adapted to be served by at least one anchor point, the method comprising:
  performing, in one of the at least one anchor points, the steps of:
    generating a Multi-key Cryptographically Generated Address (MCGA) for the mobile node;
    assigning and registering the MCGA as home address for the mobile node;
    sending a binding update message to the correspondent node on behalf of the mobile node, said binding update message including a signature of the MCGA signed by the anchor;
    receiving a binding acknowledgement message from the correspondent node, the binding acknowledgement message including an authentication credential; and
    after receiving the binding acknowledgement message, activating route optimization for traffic exchanged between the mobile node and the correspondent node.
2. Method according to claim 1, wherein public keys for the generation of the MCGA are provided by the mobile node and the at least one anchor point.

3. Method according to claim 2, wherein the nodes providing public keys for the generation of the MCGA are determined based on information stored in a database.

4. Method according to claim 2, wherein the nodes providing public keys for the generation of the MCGA are dynamically determined by the at least one anchor point.

5. Method according to claim 1 wherein a permanent home keygen token is used as part of credentials for the binding acknowledgement message.

6. Method according to claim 1, including sending a home test to the correspondent node prior to sending the binding update message.

7. Method according to claim 1, including sending a response message to the mobile node, including the result of the MCGA.

8. Method according to claim 1, including receiving information from the mobile node regarding which public key should be used for the generation of the MCGA.

9. Method according to claim 1, wherein said at least one anchor point that generates the MCGA is a local mobility anchor (LMA) located in the node's home network.

10. Method according to claim 1, wherein said at least one anchor point that generates the MCGA is a local mobility anchor (LMA) located in a network visited by the node.

11. Method according to claim 1, wherein the binding update message is signed by the private key of the at least one anchor point.

12. Method according to claim 1, wherein the optimized route takes place between the mobile node and the correspondent node via one or more access routers.

13. Method according to claim 1, wherein the step of assigning an MCGA includes the step of sending information between the mobile node and the at least one anchor point during an Internet Key Exchange (IKE) authentication procedure.

14. Method according to claim 1, wherein said mobile node requests the at least one anchor point to assign an MCGA.

15. Method according to claim 1, including receiving a public key from the mobile node along with a request for generation of an MCGA.

16. Method according to claim 1, including collecting a list of public keys required for the generation of the MCGA.

17. Method according to claim 1, including sending the complete set of public keys involved in the generation of the MCGA to the mobile node.

18. Method for optimizing a route between a mobile node and a correspondent node in mobile Internet protocol networks, said mobile node being adapted to be served by at least one anchor point, the method comprising the following steps:
   generating a Multi-key Cryptographically Generated Address (MCGA) for the mobile node by one of said anchor points;
   assigning and registering the MCGA as home address for the mobile node;
   sending a binding update message from the at least one anchor point to the correspondent node, said binding update message including a signature of the MCGA signed by the anchor point;
   authenticating the binding update message by verifying the sign are in the correspondent node;
   sending a binding acknowledgement message from the correspondent node to the anchor; and
   establishing a route optimized path for the traffic exchange, between the mobile node and the correspondent node.

19. An anchor node to be arranged in a mobile Internet protocol network and to be arranged to optimize a route between a mobile node and a correspondent node, the anchor node including:
   a generating unit for generating a Multi-key Cryptographically Generated Address (MCGA) for the mobile node;
   a processing unit for assigning and registering the MCGA as home address for the mobile node;
   a transmitting unit for sending a binding update message to the correspondent node on behalf of the mobile node, said binding update message including a signature of the MCGA signed by the anchor node; and
   a receiving unit for receiving a binding acknowledgement message from the correspondent node, the binding acknowledgement message including an authentication credential,
   wherein the processing unit is arranged to activate route optimization after the receiving unit receives the binding acknowledgement message.

20. The node according to claim 19, including a memory arranged to store binding information for nodes.

* * * * *

UNITED STATES PATENT AND TRADEMARK OFFICE
CERTIFICATE OF CORRECTION

PATENT NO.         : 8,516,256 B2
APPLICATION NO.    : 12/863042
DATED              : August 20, 2013
INVENTOR(S)        : Vogt et al.

It is certified that error appears in the above-identified patent and that said Letters Patent is hereby corrected as shown below:

On the Title Page, Item (57), under "ABSTRACT", in Column 2, Line 1, delete "The present invention the present invention concerns" and insert -- The present invention concerns --, therefor.

In the Specification

In Column 1, Lines 15-16, delete "link Mobility" and insert -- link. Mobility --, therefor.

In Column 1, Line 25, delete "link The" and insert -- link. The --, therefor.

In Column 7, Line 4, delete "update message 205" and insert -- update message 210 --, therefor.

In the Claims

In Column 11, Line 7, in Claim 5, delete "claim 1 wherein" and insert -- claim 1, wherein --, therefor.

In Column 12, Line 17, in Claim 18, delete "sign are" and insert -- signature --, therefor.

Signed and Sealed this
Fourth Day of February, 2014

Michelle K. Lee
*Deputy Director of the United States Patent and Trademark Office*